(12) United States Patent
Sopko et al.

(10) Patent No.: US 8,457,824 B2
(45) Date of Patent: Jun. 4, 2013

(54) EMBEDDED CONTROLLER FREQUENCY INPUTS RE-USED FOR SPEED SENSOR DIAGNOSTICS

(75) Inventors: Tyge Alan Sopko, Dubuque, IA (US); Zimin Wu Vilar, Dubuque, IA (US); Christopher John Tremel, West Fargo, ND (US)

(73) Assignee: Deere & Company, Moline, IL (US)

( * ) Notice: Subject to any disclaimer, the term of this patent is extended or adjusted under 35 U.S.C. 154(b) by 262 days.

(21) Appl. No.: 13/037,963

(22) Filed: Mar. 1, 2011

(65) Prior Publication Data
US 2012/0226397 A1 Sep. 6, 2012

(51) Int. Cl.
*B60L 9/00* (2006.01)

(52) U.S. Cl.
USPC .................. 701/22; 361/42; 324/509; 701/51

(58) Field of Classification Search
USPC ............ 701/117, 22; 340/933, 6.1; 381/71.1; 705/13; 361/42, 50; 324/509; 360/75, 77.02; 702/64, 67; 700/293, 286, 292, 297, 291; 219/718; 388/716; 715/735, 784
See application file for complete search history.

(56) References Cited

U.S. PATENT DOCUMENTS

| | | |
|---|---|---|
| 2007/0008666 A1* | 1/2007 | Morita et al. .................. 361/42 |
| 2012/0007749 A1* | 1/2012 | Oldknow et al. ............. 340/933 |
| 2012/0029798 A1* | 2/2012 | Miller .......................... 701/117 |

* cited by examiner

*Primary Examiner* — Behrang Badii
(74) *Attorney, Agent, or Firm* — Faegre Baker Daniels LLP (57) ABSTRACT

A vehicle is provided having an electric machine and a speed detector coupled to the electric machine. A controller is coupled to the speed detector. The controller may analyze the integrity of communication between the speed detector and the controller based on a frequency signal provided with the speed detector.

15 Claims, 6 Drawing Sheets

EMBEDDED CONTROLLER FREQUENCY INPUTS RE-USED FOR SPEED SENSOR DIAGNOSTICS

FIELD

The present disclosure relates to sensor diagnostics, and more particularly to a system and method for diagnosing a speed sensor of a vehicle using embedded controller frequency inputs.

BACKGROUND AND SUMMARY

Modern electronic control units (ECU's) found in on- and off-road vehicles contain several inputs for communicating with various vehicle sensors. Vehicle sensors are often provided in embedded systems having a microprocessor and software. Due to the complexity and the number of sensors in many of these embedded systems, it is desirable for the ECU to determine when a sensor is malfunctioning. In some instances, a sensor may fail but still produce a valid in-range signal. Traditional methods of detecting sensor malfunction include voltage or current biasing and electronic keying. Biasing may involve biasing a line of an electrical connector with a voltage and detecting a failed sensor or sensor connector based on detection of an electrical abnormality. Electronic keying may involve grounding one or more lines of an electrical connector and detecting a failed sensor or damaged connector based on the detected grounding scheme of the lines of the electrical connector.

According to an embodiment of the present disclosure, a vehicle is provided including a chassis, a ground engaging mechanism configured to support the chassis, and an electric machine supported by the chassis. The electric machine includes at least one of a generator and a motor. A detector is configured to detect a speed of the electric machine. A controller coupled to the detector is configured to control the electric machine. The detector is configured to provide a frequency output to the controller representative of the detected speed of the electric machine and a diagnostic signal to the controller having a predetermined frequency. The detector automatically provides the diagnostic signal to the controller upon activation of the detector and prior to providing the frequency output to the controller. The controller is configured to detect a communication fault between the detector and the controller based on the diagnostic signal.

According to another embodiment of the present disclosure, a method of diagnosing sensor communication for a vehicle is provided. The method includes the step of providing a vehicle having a ground engaging mechanism and a motor configured to drive the ground engaging mechanism. The vehicle includes a control system including a controller and a detection system, and the controller is configured to control the motor. The detection system is coupled to the motor and is configured to provide motor speed feedback to the controller. The method includes the steps of activating the control system of the vehicle and generating a diagnostic signal with the detection system upon activation of the control system. The diagnostic signal has a predetermined frequency. The method further includes generating a frequency-based speed signal representative of the detected speed of the motor after generation of the diagnostic signal. The method further includes detecting a communication fault between the controller and the detection system based on a comparison of a detected frequency of the diagnostic signal with the predetermined frequency.

According to yet another embodiment of the present disclosure, a vehicle is provided including a chassis, a ground engaging mechanism supporting the chassis, and an electric machine. A machine control unit is configured to control the electric machine. The machine control unit includes a sensor configured to detect a speed of the electric machine. A controller in communication with the machine control unit is configured to provide a command to the machine control unit. The machine control unit is configured to provide a frequency output to the controller representative of the detected speed of the electric machine and a diagnostic signal to the controller having a predetermined frequency. The machine control unit generates the diagnostic signal upon the frequency output detected at the controller indicating an improper speed of the vehicle. The controller is configured to detect a communication fault based on the diagnostic signal.

BRIEF DESCRIPTION OF THE DRAWINGS

The above-mentioned and other features and advantages of the invention, and the manner of attaining them, will become more apparent and the disclosure itself will be better understood by reference to the following description taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

The embodiments disclosed herein are not intended to be exhaustive or to limit the disclosure to the precise forms disclosed in the following detailed description. Rather, the embodiments are chosen and described so that others skilled in the art may utilize their teachings.

Figure 1:
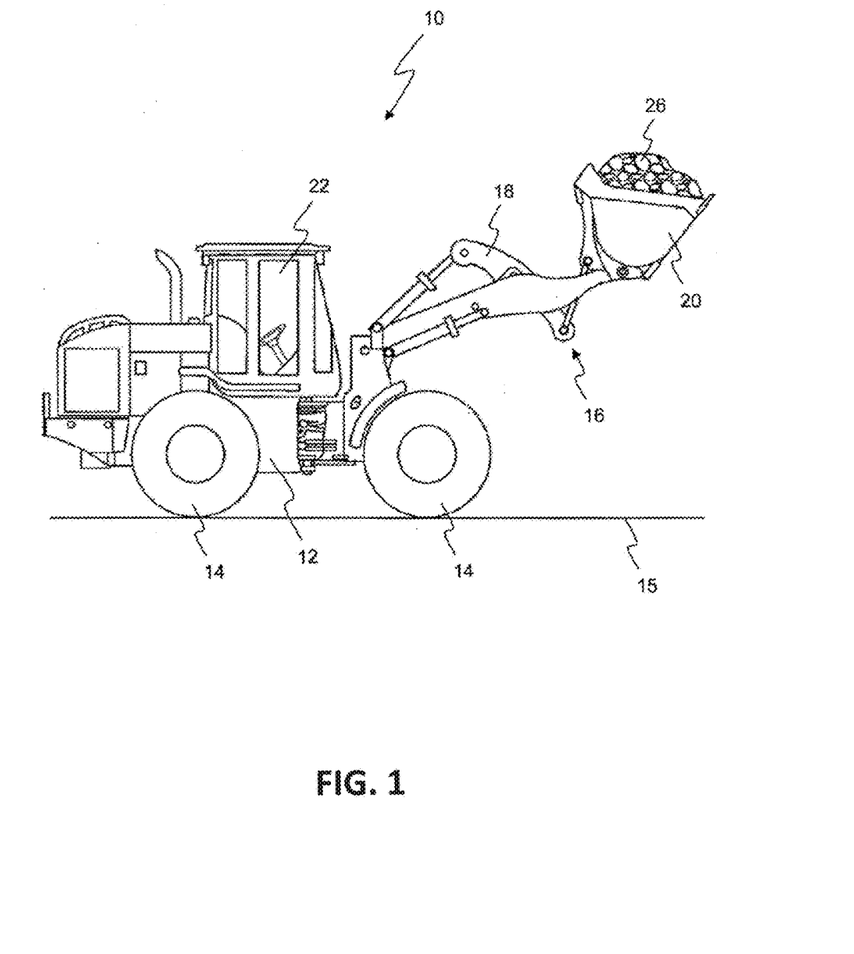
FIG. 1 illustrates an exemplary vehicle incorporating the sensor diagnostic system of the present disclosure.

Referring to FIG. 1, an exemplary utility vehicle in the form of a loader 10 is provided. Although the utility vehicle is illustrated and described herein as loader 10, the utility vehicle 10 may include a motor grader, a tractor, a bulldozer, a feller buncher, a crawler, an excavator, a skidder, a forwarder, or another utility vehicle. Loader 10 includes a chassis 12 and a ground engaging mechanism 14. Ground engaging mechanism 14 is capable of supporting chassis 12 and propelling chassis 12 across the ground 15. Although the illustrated loader 10 includes wheels as ground engaging mechanism 14, loader 10 may include other ground engaging mechanisms, such as steel tracks, rubber tracks, or other suitable ground engaging members.

Loader 10 further includes a loader assembly 16. As illustrated in FIG. 1, loader assembly 16 includes a loader boom 18 and a work tool 20 in the form of a bucket. Work tool 20 may be capable of moving, excavating, plowing, or performing other material handling functions on a load 26, such as dirt or other materials. Other suitable work tools include, for example, blades, pallet forks, bail lifts, augers, harvesters, tillers, mowers, and grapples. Loader boom 18 is configured to move relative to chassis 12 to move and operate work tool 20. An operator controls the functions of loader 10, including ground engaging mechanism 14 and loader assembly 16, from an operator station 22 supported by chassis 12.

Figure 2:
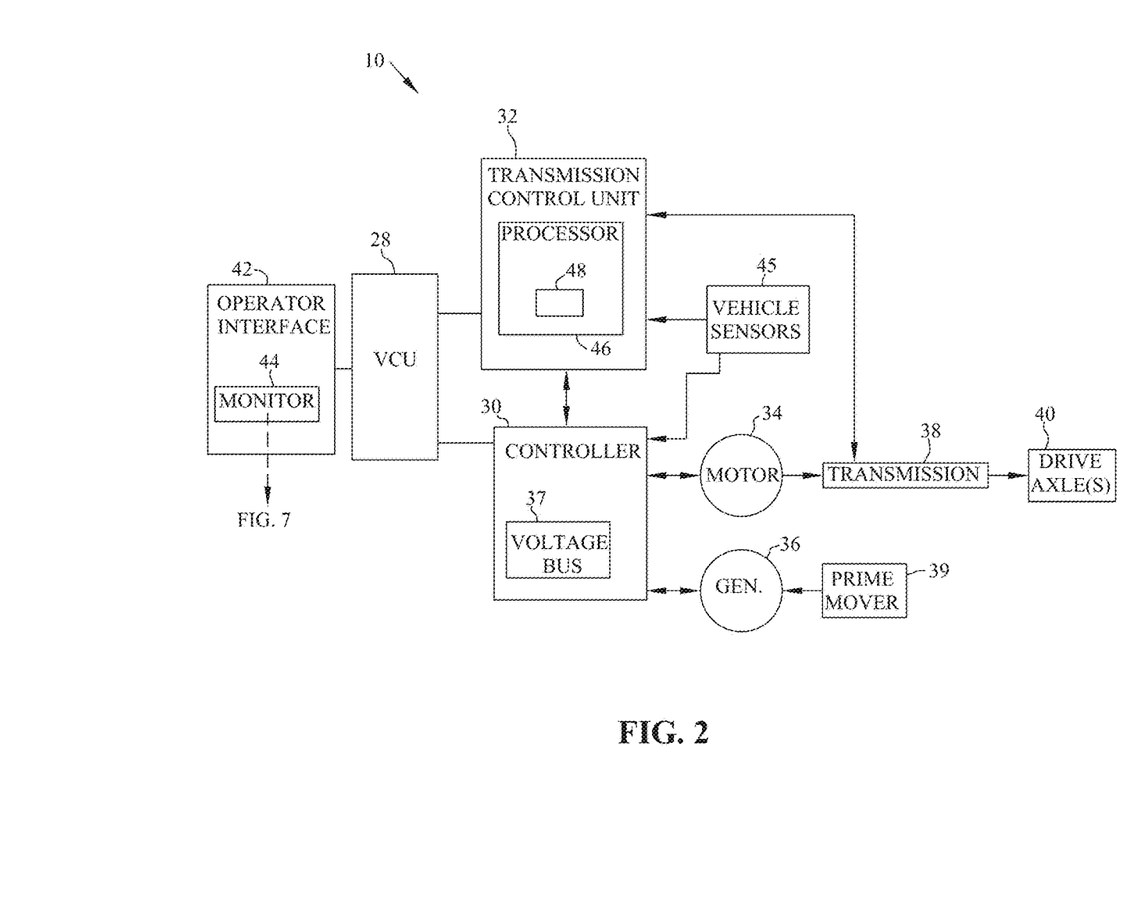
FIG. 2 illustrates a representative view of an exemplary control system of the vehicle of FIG. 1.

Referring to FIG. 2, vehicle 10 includes a controller 30 configured to control one or more electric machines. Controller 30 may include multiple control units for controlling multiple electric machines, as described herein. In the illustrated embodiment, controller 30 controls a motor 34 and a generator 36, although additional or fewer electric machines may be controlled by controller 30. Vehicle 10 illustratively includes a transmission control unit (TCU) 32 coupled to controller 30 and to a transmission 38. TCU 32, which includes a processor 46 and software stored in a memory 48 of processor 46, is configured to receive user input and various vehicle parameters for controlling transmission 38 and for issuing electric machine commands to controller 30 for controlling motor 34 and generator 36. For example, controller 30 may provide vehicle parameters, such as electric machine speed feedback, to TCU 32. In one embodiment, transmission 38 may include a speed sensor providing transmission speed feedback to TCU 32. Vehicle 10 may further include various sensors 45, such as temperature or pressure sensors, configured to provide additional vehicle parameters to TCU 32 and controller 30. Based on vehicle parameters and user input, TCU 32 is configured to control and modulate transmission 38. In one embodiment, TCU 32 uses closed-loop controls for providing motor commands, such as motor torque demand, to controller 30.

Motor 34 is configured to drive a drive axle 40 of vehicle 10 through transmission 38. Additional motors 34 may be provided to drive one or more drive axles 40 of vehicle 10. In the illustrated embodiment, drive axle 40 drives a ground engaging mechanism 14. In one embodiment, vehicle 10 may not include a transmission 38, and motor 34 may be coupled to a final drive of ground engaging mechanism 14.

Generator 36 is coupled to a prime mover 39 and is configured to generate electrical power for use by vehicle 10. In particular, generator 36 is mechanically coupled to prime mover 39 such that the rotation of prime mover 39 causes corresponding rotation of a rotor of generator 36, thereby generating electrical power through windings of generator 36. Generator 36 routes the generated power to controller 30 for storage in a voltage bus 37. In one embodiment, voltage bus 37 is a high voltage DC bus including several capacitors for storing generated power and providing the power to motor 34 or to other devices of control system 10. In one embodiment, a generator control unit 52 (see FIG. 3) routes the generated power to voltage bus 37, and a motor control unit 50 (see FIG. 3) routes the power from the voltage bus 37 to motor 34. Prime mover 39 may be controlled by a controller, such as one of controllers 28, 30, 32. In one embodiment, prime mover 39 is a diesel engine, although other suitable prime movers may be used. In one embodiment, controller 30 may also direct the generated power to a vehicle battery for storage. Motor 34 and generator 36 may include permanent magnet direct current (PMDC) machines, switched reluctance machines, or other suitable electric machines.

Vehicle 10 further includes an operator interface 42 providing an operator with inputs, feedback, and controls for vehicle 10. For example, operator interface 42 may include a steering device, a brake, an accelerator, a transmission shifter, and other input devices. Operator interface 42 may include a display providing various vehicle parameters such as vehicle speed, ground speed, and other parameters. In the illustrated embodiment, operator interface 42 includes a monitor 44 providing diagnostic information received from controller 30 and/or TCU 32, as described herein. In the illustrated embodiment, vehicle 10 further includes a vehicle control unit (VCU) 28 configured to drive the operator interface 42. For example, VCU 28 may provide vehicle speed, transmission gear, vehicle temperature data, and other vehicle parameters to operator via monitor 44. In one embodiment, VCU 28 may provide operator inputs received from operator interface 42 to the appropriate controllers 30, 32.

Figure 3:
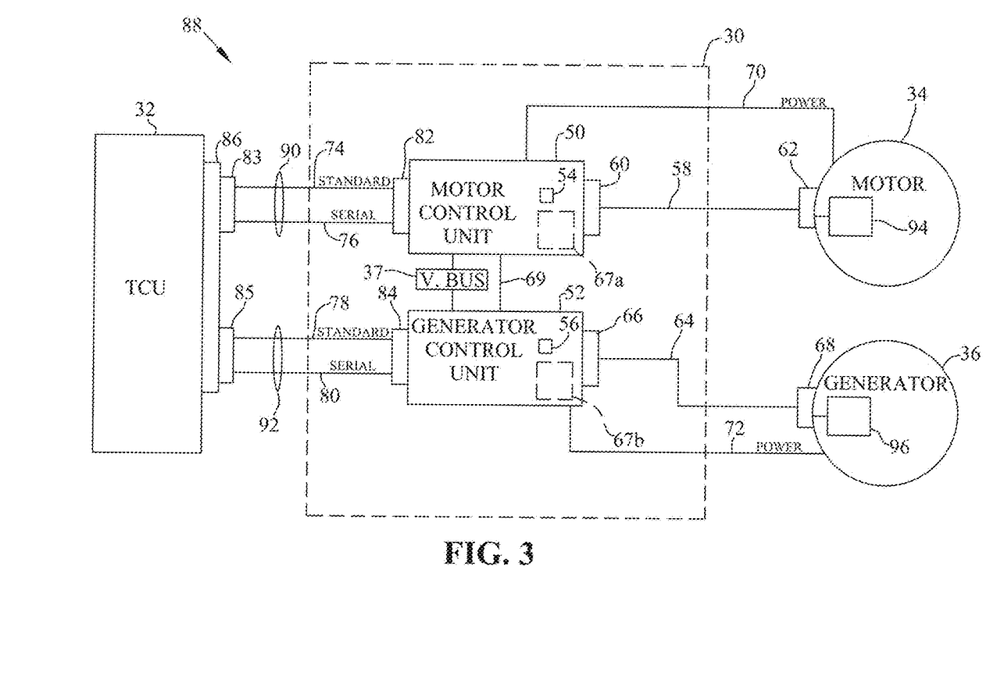
FIG. 3 illustrates a representative view of an exemplary sensor diagnostic system of the vehicle of FIG. 1 including a transmission control unit and a controller coupled to a motor and a generator.

Vehicle 10 includes a sensor diagnostic system 88, as illustrated in FIG. 3 and described herein. Referring to FIG. 3, controller 30 includes motor control unit 50 and generator control unit 52. In one embodiment, control units 50, 52 may be provided in a housing or cabinet along with other components of controller 30. In the illustrated embodiment, motor control unit 50 and generator control unit 52 are embedded controllers comprising a control board having a processor 102 (see FIG. 4) for controlling motor 34 and generator 36. Motor control unit 50 and generator control unit 52 are configured to control motor 34 and generator 36, respectively, based on processor software instructions, controls from TCU 32, and feedback from various sensors on vehicle 10. Motor control unit 50 and generator control unit 52 serve as detectors or detection systems for detecting machine speed based on feedback from electric machines 34, 36. In the illustrated embodiment, control units 50, 52 serve as inverters configured to provide speed feedback to TCU 32.

Generator control unit 52 includes a driver 56 for providing electric power from generator 36 to voltage bus 37. Motor control unit 50 includes a driver 54 configured to provide electric power from voltage bus 37 to motor 34. In one embodiment, drivers 54, 56 are embedded systems or control boards having a processor or application specific integrated circuit (ASIC) and a plurality of insulated-gate bipolar transistors (IGBT's). In one embodiment, driver 56 receives power from generator 36 over power lines 72 and directs rectified power to voltage bus 37 for storage, and driver 54 provides power from voltage bus 37 to motor 34 over power lines 70.

In the illustrated embodiment, motor control unit 50 and generator control unit 52 are coupled together for communication therebetween, as illustrated with connection 69. For example, one control unit 50, 52 may notify the other control unit 50, 52 of the existence of a fault. In one embodiment, motor control unit 50 and generator control unit 52 communicate over serial bus communication, such as controller area network (CAN) bus, for example.

Each controller 50, 52 includes a connector or wire harness coupled to TCU 32 for communication with TCU 32. Referring to FIG. 3, a wire harness 90 is coupled between motor control unit 50 and TCU 32 and includes a connector 82 for attaching harness 90 to motor control unit 50 and a connector 83 for attaching harness 90 to TCU 32. Similarly, a wire harness 92 is coupled between generator control unit 52 and TCU 32 and includes a connector 84 for attaching harness 92 to generator control unit 52 and a connector 85 for attaching harness 92 to TCU 32. TCU 32 further includes one or more connectors 86 for receiving connectors 83, 85 of harnesses 90, 92. In one embodiment, connectors 83, 85 are included on a single connector.

In one embodiment, connectors 83, 85 are mechanically keyed to provide proper connection to TCU 32. As such, frequency inputs provided with control units 50, 52 are in pre-determined input pin positions at TCU 32. As described herein, connectors 83, 85 may be provided with a signal physical connector such that the frequency input positions are provided in a common physical enclosure. Mechanically-keyed connectors serve to reduce the likelihood of installing a connector in a reversed or otherwise improper orientation.

Harnesses 90, 92 illustratively each include several communication lines configured to support different communication protocols. In the illustrated embodiment, harness 90 includes a standard hard-wired line 74 and a serial communication line 76, and each line 74, 76 may include one or more wires for communication. Motor control unit 50 provides motor feedback, such as speed feedback, over standard communication line 74 to TCU 32, and TCU 32 and motor control unit 50 provide control and other communication signals over serial communication line 76. Similarly, harness 92 includes a standard hard-wired line 78 for generator feedback, such as speed feedback, to TCU 32 and a serial communication line 80 for control and other communication between TCU 32 and generator control unit 52. In one embodiment, machine speed feedback is also provided over serial communication lines 76, 80. Standard or direct communication lines 74, 78 may provide frequency feedback and digital inputs to TCU 32. In one embodiment, the data provided over standard lines 74, 78 is more deterministic than the data provided over serial communication lines 76, 80. In the illustrated embodiment, serial communication lines 76, 80 are CAN bus lines.

A battery supply and switched power may also be provided over harnesses 90, 92 between TCU 32 and control units 50, 52. The battery supply may provide power to electronics on TCU 32 and low-voltage electronics on control units 50, 52. The switched power may be energized from an ignition relay provided on vehicle 10.

A connector or wire harness is also coupled between each electric machine of vehicle 10 and each corresponding control unit. Referring to FIG. 3, a wire harness 58 coupled between motor control unit 50 and motor 34 includes a connector 60 for attaching harness 58 to motor control unit 50 and a connector 62 for attaching harness 58 to motor 34. Similarly, a wire harness 64 coupled between generator control unit 52 and generator 36 includes a connector 66 for attaching harness 64 to generator control unit 52 and a connector 68 for attaching harness 64 to generator 36. In the illustrated embodiment, harnesses 58, 64 provide standard analog or digital communication, although harnesses 58, 64 may support other communication protocols. Power may also be provided over harnesses 58, 64 to energize sensors on machines 34, 36. In the illustrated embodiment, motor 34 includes a position sensor 94 for detecting the rotational position of motor 34 and for providing speed feedback from motor 34 to control unit 50 via harness 58. Similarly, generator 36 includes a position sensor 96 for detecting the rotational position of generator 36 and for providing speed feedback from generator 36 to control unit 52 via harness 64. In one embodiment, position sensors 94, 96 are resolvers. Alternatively, position sensors 94, 96 may be encoders, such as mechanical or optical quadrature encoders or magnetoresistive encoders, for example. Control units 50, 52 and respective position sensors 94, 96 cooperate to serve as speed detection systems for vehicle 10.

In the illustrated embodiment, motor control unit 50 and generator control unit 52 are configured to provide outputs to TCU 32 representative of the speed of the corresponding electric machine 34, 36. In the illustrated embodiment, control units 50, 52 calculate the rotational velocity of the respective electric machine 34, 36 based on feedback from the position sensor 94, 96 and transmit a corresponding pulsed speed signal or square wave to TCU 32. The pulsed speed signal provided with control units 50, 52 may be configured to minimize electromagnetic interference (EMI) in harnesses 58, 64 and to maximize sampling accuracy on the signal with TCU 32. In one embodiment, a high frequency signal corresponds to a maximum reverse machine speed, a median frequency signal corresponds to a zero machine speed, and a low frequency signal corresponds to a maximum forward machine speed. As such, a zero frequency signal detected at TCU 32 may indicate a communication error. In one embodiment, the frequency of the pulsed signal is proportional to a rotational speed of the electric machine 34, 36. In the illustrated embodiment, the pulsed speed signal is provided over standard lines 74, 78. In one embodiment, speed feedback is also provided to TCU 32 over serial communication lines 76, 80.

Figure 4:
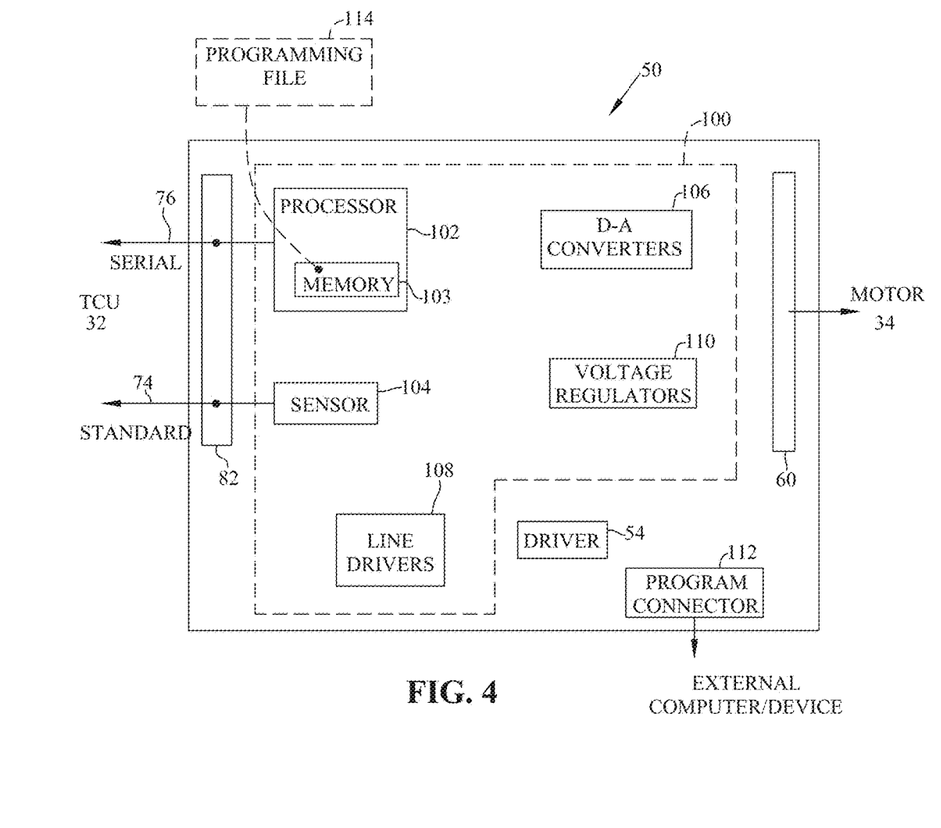
FIG. 4 illustrates a representative view of an exemplary control unit of the controller of FIG. 3.

Referring to FIG. 4, an exemplary motor control unit 50 is illustrated. While the following describes FIG. 4 with reference to motor control unit 50 and motor 34, the description of FIG. 4 also applies to generator control unit 52 and generator 36. Motor control unit 50 of FIG. 4 includes a sensor or inverter 100 configured to provide a pulsed signal having a frequency corresponding to the rotational speed of motor 34. In particular, inverter 100 produces an analog or square wave speed feedback signal based on the speed information provided with position sensor 94 of motor 34 (see FIG. 3). Motor control unit 50 communicates the pulsed signal provided with inverter 100 over standard line 74 to provide real-time speed feedback to TCU 32. In one embodiment, motor control unit 50 also communicates speed feedback provided with inverter 100 over serial or CAN bus line 76. Motor control unit 50 illustratively includes one or more line drivers 108 configured to provide the pulsed signal to TCU 32 over standard line 74. Line drivers 108 may include field-effect transistors. In one embodiment, line drivers 108 include MOSFET drivers for providing the pulsed speed feedback signal from a sensor 104 of inverter 100 to TCU 32. Motor control unit 50 also may include digital-to-analog convertors 106 and voltage regulators 110.

In the illustrated embodiment, inverter 100 includes a microprocessor 102 and sensor 104 cooperating to provide the speed feedback to TCU 32. A memory 103 contains software for controlling and/or programming sensor 104. Memory 103 may be internal or external to microprocessor 102. In the illustrated embodiment, sensor 104 is a signal generator configured to generate a speed signal based on feedback from position sensor 94 of motor 34. In one embodiment, sensor 104 is a field-programmable gate array (FPGA) configured to convert the digital feedback from position sensor 94 to an analog or square wave signal that is transmitted to TCU 32 via line drivers 108. In the illustrated embodiment, inverter 100 includes a programming file 114, such as an end-of-line (EOL) file 114, stored in memory 103. Microprocessor 102 may use data stored in programming file 114 to control or command sensor 104. For example, microprocessor 102 may cause sensor 104 to generate a signal at a particular frequency, such as a diagnostic frequency, based on data in programming file 114, as described herein. Microprocessor 102 is also configured to control communication over CAN bus line 76.

Sensor 104 is illustratively re-programmable based on instructions in memory 103. In one embodiment, sensor 104 is re-programmed over CAN bus line 76 by updating programming file 114 contained in memory 103. Alternatively, motor control unit 50 may include a separate programming connector 112 for connecting an external computer or programming device to motor control unit 50 for re-programming sensor 104. In one embodiment, processor 102 is also re-programmable through CAN bus line 76 or programming connector 112.

In addition to cooperating with sensor 104 to provide frequency-based machine speed feedback to TCU 32, microprocessor 102 also controls the operation of motor 34. For example, microprocessor 102 may control motor 34 based on the rotational speed feedback from position sensor 94, software instructions, feedback from vehicle sensors 45, and torque commands from TCU 32. In the illustrated embodiment, microprocessor 102 is configured to detect and diagnose communication failures between control unit 50 and motor 34, as described herein.

In the illustrated embodiment, inverter 100 of each control unit 50, 52 is configured to produce a unique diagnostic signal or pulse train. In particular, each control unit 50, 52 is configured to produce an analog or square wave diagnostic signal having a predetermined frequency and duration. In the illustrated embodiment, the frequency and duration of the diagnostic signal is set by programming file 114 contained in memory 103 of microprocessor 102 (see FIG. 3). Alternatively, control units 50, 52 may include dip switches 67a, 67b for setting the diagnostic frequency. As with the frequency feedback for machine speed, the diagnostic signal is provided over the standard communication line (for example, standard line 74 and standard line 78 of FIG. 3) and received in real-time at the frequency input pins of TCU 32. Based on the diagnostic signal, TCU 32 is configured to identify and assess the operation of the associated control unit 50, 52. As described herein, the diagnostic signal may be used to identify each control unit 50, 52 to TCU 32 at startup and to monitor proper operation and connection of control unit 50, 52 at startup and during runtime of controller 30.

Figure 5A:
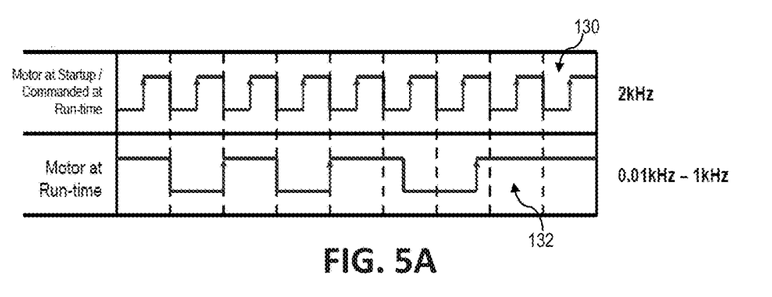
FIG. 5A illustrates an exemplary diagnostic signal and an exemplary speed feedback signal provided with the control unit of FIG. 4.

See, for example, the exemplary diagnostic signal 130 and motor speed feedback signal 132 illustrated in FIG. 5A. Diagnostic signal 130 illustratively has a frequency of about 2 kilohertz (kHz), and the motor speed signal 132 has a frequency ranging from about 0.01 kHz to about 1 kHz. As such, the diagnostic signal 130 may be distinguishable from the speed feedback. Alternatively, the frequency range of motor speed signal 132 may overlap with the frequency of diagnostic signal 130. In one embodiment, the diagnostic signals of the control units of controller 30 have a duty cycle of about 50% and a duration ranging from about 100 milliseconds (ms) to about 140 ms.

Figure 5B:
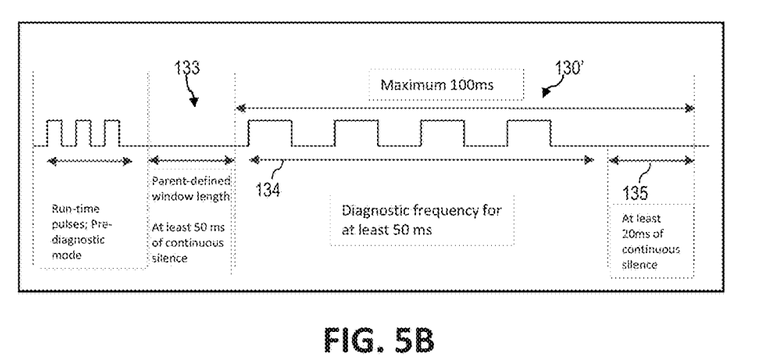
FIG. 5B illustrates another exemplary diagnostic signal provided with the control unit of FIG. 4.

Referring to FIG. 5B, another exemplary diagnostic signal 130' is illustrated. Diagnostic signal 130' includes an initial zero-frequency period 133 of about 50 ms, followed by a diagnostic frequency period 134 of about 50 to 70 ms, followed by another zero-frequency period 135 of about 20 ms. In the illustrated embodiment, the machine speed feedback provided with control units 50, 52 has frequencies ranging from low to high with no periods of zero frequency. As such, a period of zero-frequency before and after the period of the diagnostic frequency distinguishes the diagnostic signal from normal machine speed feedback.

In the illustrated embodiment, TCU 32 stores in memory 48 the signature, including the frequency and duration, of the diagnostic signal associated with each control unit of controller 30. A variation between the expected diagnostic signal stored in TCU 32 and the actual diagnostic signal received by TCU 32 may indicate a problem in the operation of the control unit 50, 52. For example, TCU 32 may analyze the received diagnostic signal to detect an improper or missing harness connection, a malfunctioning sensor, or a problem with software. Upon detecting a problem with the control unit, software, or connector based on the diagnostic signal, TCU 32 is configured to provide a warning or fault to the operator of vehicle 10, as described herein.

In one example, if TCU 32 detects zero frequency at the frequency input upon the generation of the diagnostic signal by control unit 50, TCU 32 may determine that harness 90 is disconnected or that harness 90 or inverter 100 has failed. In particular, if TCU 32 is able to communicate properly with inverter 100 via serial line 76, TCU 32 may determine that sensor 104 of inverter 100 has failed. If TCU 32 is not able to communicate with inverter 100 over serial line 76, TCU 32 may determine that harness 90 has disconnected or failed.

In another example, if TCU 32 identifies missing pulses in a diagnostic signal from motor control unit 50, an improper connection of harness 90 may be detected by TCU 32. In particular, if the signature of the diagnostic signal received at TCU 32 has erratic pulses compared to the signature stored at memory 48 of TCU 32, a loose or unstable connection of harness 90 may be detected.

In the illustrated embodiment, the diagnostic signal is generated at startup of controller 30 to identify each control unit 50, 52 to TCU 32 and to verify proper connection between TCU 32 and the respective control unit 50, 52. In particular, TCU 32 identifies the associated control unit 50, 52 based on the unique frequency in the diagnostic signal. TCU 32 may analyze the received diagnostic signal to detect an improper connection to the corresponding control unit 50, 52 or to detect a malfunctioning inverter 100 or position sensor 94, 96, as described herein. Following generation of the diagnostic signal at startup, inverter 100 is configured to provide machine speed feedback to TCU 32. In one embodiment, each control unit 50, 52 also automatically generates the diagnostic signal after exiting a standby state and entering an active state to re-initialize TCU 32.

The diagnostic signal may also be generated while motor 34 and/or generator 36 are running as a system diagnostic. As described below, the runtime generation of the diagnostic signal may be initiated by TCU 32 on command or by the control unit 50, 52 in response to a reset condition.

Figure 6:
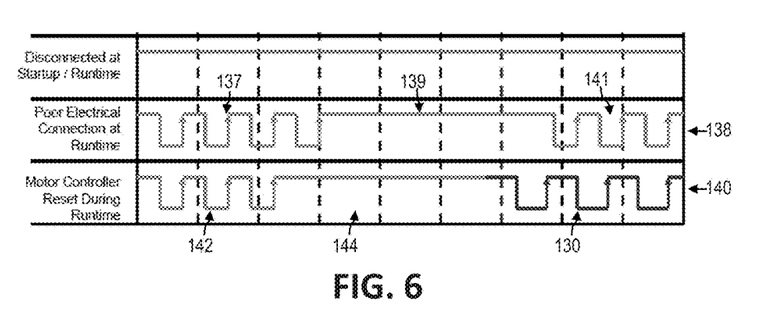
FIG. 6 illustrates exemplary feedback signals detected at the transmission control unit of FIG. 3.

If TCU 32 detects erratic speed changes in the frequency signal provided over standard line 74, 78 that exceed the inertia limits of the corresponding electric machine 34, 36, TCU 32 may request transmission of the diagnostic signal during runtime as a diagnostic check of the control unit 50, 52 and connectors. For example, referring to signal 138 of FIG. 6, TCU 32 detects a first generator speed with a frequency 137, followed by a second generator speed with a frequency 139, followed by a third generator speed with a frequency 141. If detected frequencies 137, 139, and 141 indicate that the speed of generator 36 changed at rate that exceeds the capability of machine 34, 36, such erratic frequency changes may be indicative of a poor or loose electrical connection between TCU 32 and the control unit 50, 52. For example, a detected rate of speed change of 2000 rpm per second may indicate a communication error. TCU 32 may request re-production of the diagnostic signal upon detection of erratic speed changes to check that the proper diagnostic frequency and duration is received at the input. Based on analysis of the diagnostic signal detected at the input, TCU 32 may determine harness 90, 92 is improperly connected, as described herein. In one embodiment, TCU 32 requests the re-production of the diagnostic signal via CAN bus communication.

In one embodiment, TCU 32 may determine an improper electrical connection based on erratic speed change upon detection of the electric machine 34, 36 changing speeds at a rate that exceeds a predetermined maximum or threshold rate. For example, the predetermined maximum rate may be a rate of 1000 rpm per second.

As described herein, control unit 50, 52 may also provide speed feedback over serial communication line 76, 80. In this configuration, TCU 32 may detect erratic speed feedback based on a comparison of the real-time speed feedback provided over standard line 74, 78 and the speed feedback provided over serial line 76, 80. Upon detecting inconsistencies in speed feedback at different inputs, TCU 32 may initiate the generation of the diagnostic signal to further analyze the connection of harness 90, 92.

In one embodiment, the real-time machine speed feedback provided over standards lines 74, 78 is routed through a filter of control unit 50, 52 before reaching TCU 32. As such, some pulses or noise in the machine speed feedback may be filtered out prior to reaching TCU 32. Further, the filter may be disabled during generation of the diagnostic signal such that each pulse of the diagnostic signal is received at TCU 32. As such, the diagnostic signal provides a complete and unfiltered signal that may be analyzed by TCU 32. As such, TCU 32 is better able to diagnose system errors with the diagnostic signal as compared to normal machine speed feedback due to the lack of filtering of the diagnostic signal.

Control unit 50, 52 may also automatically cause re-generation of the diagnostic signal at runtime due to a reset of inverter 100. Inverter 100 may reset during operation of vehicle 10 due to a system malfunction, a board failure, a power failure, etc. Upon reset, inverter 100 is configured to generate the diagnostic signal automatically due to the startup condition. TCU 32 may detect the unexpected reset of inverter 100 upon observing normal machine speed feedback, followed by a period of zero frequency, followed by the diagnostic signal frequency. For example, referring to exemplary signal 140 of FIG. 6, TCU 32 detects a machine speed signal 142, followed by signal 144 with zero frequency, followed by the diagnostic signal 130. Based on the detected reset condition, TCU 32 may determine that the control unit 50, 52 has malfunctioned. For example, TCU 32 may receive a fault code from inverter 100 via serial line 76, 80 indicating a cause of the reset. Further, TCU 32 may determine the cause of the reset based on an analysis of the diagnostic signal.

Control unit 50, 52 is also configured to detect and diagnose communication failures between control unit 50, 52 and the respective electric machine 34, 36. In particular, inverter 100 may detect an error with position sensor 94, 96 or with harness 58, 64 and transmit a fault code to TCU 32 via serial communication line 76, 80 indicative of the detected error. With this fault notification from inverter 100, TCU 32 may determine that improper or erratic machine speed feedback detected over standard line 74, 78 is the result of a problem with position sensor 94, 96 or harness 58, 64 rather than with inverter 100 or harness 90, 92. Further, in this configuration, inverter 100 may notify TCU 32 of a communication problem between electric machine 34, 36 and inverter 100 that would otherwise be undetectable by TCU 32 with the diagnostic signal.

The diagnostic frequency may also be used for runtime timestamping. Specific control units of vehicle 10 may power up in a different sequence at the startup of vehicle 10 or controller 30. Based on the diagnostic signal received from each control unit at startup, TCU 32 is provided with a timebase for the local clocks of each control unit relative to the clock of TCU 32. Accordingly, TCU 32 may provide an offset algorithm to coordinate the initiation of control signals (for example, torque command) to the control units based on the calculated timebase. For example, in a vehicle with multiple motors, TCU 32 may offset torque commands to the different motors based on the calculated timebase such that all motors of the vehicle provide the torque to the drive axle or axles in a synchronized fashion.

TCU 32 may also detect software problems and conflicts based on the diagnostic frequency. For example, if TCU 32 detects a proper diagnostic signal from control unit 50, 52 having a frequency that does not match the expected frequency for that control unit 50, 52, TCU 32 may determine a software conflict exists due to incorrect software being loaded on control unit 50, 52 and/or TCU 32. Similarly, if TCU 32 detects a diagnostic signal from motor control unit 50 that matches the expected diagnostic signal from another control unit of controller 30, such as generator control unit 52, TCU 32 may determine that the wrong software is loaded on motor control unit 50.

In an alternative configuration, inverter 100 may comprise an intelligent sensor having several standard hard-wired lines providing communication between TCU 32 and the control unit 50, 52. In this configuration, the intelligent sensor may transmit the machine speed feedback and/or diagnostic signal over one or more lines and a fault code or other control data over other lines. Further, the fault code may be in the form of a particular frequency. For example, the intelligent sensor may transmit a first frequency for the diagnostic signal, a second frequency indicating a hard reset, a third frequency indicating a software mismatch or failure, and a fourth frequency indicating a communication failure with position sensors 94, 96, etc.

Figure 7:
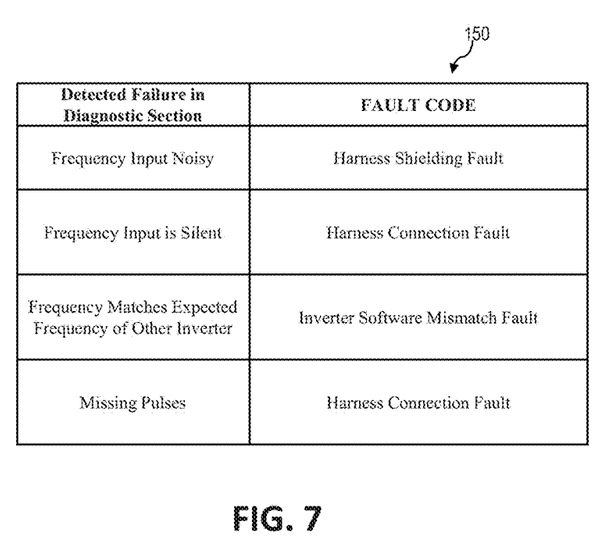
FIG. 7 illustrates exemplary fault codes provided with the transmission control unit of FIG. 3.

Upon detecting a system malfunction with the diagnostic signal, such as a problem with the control unit, software, or harness connection, TCU 32 is configured to provide a warning or fault code to the operator of vehicle 10. In the illustrated embodiment, TCU 32 provides an error code to the operator via monitor 44 of operator interface 42 (see FIG. 2). See, for example, several exemplary error or fault codes 150 illustrated in FIG. 7. Referring to FIG. 7, when TCU 32 detects observable noise on the diagnostic signal, TCU 32 may issue a harness shielding fault indicating that the connector or harness 90, 92 is not properly shielded. Similarly, when TCU 32 fails to detect a frequency input or determines the frequency input is missing pulses, TCU 32 issues a harness connection fault indicating a loose or missing connection of the harness 90, 92. As described herein, this fault may be further determined based on feedback from inverter 100 over serial line 76, 80. When the frequency of the diagnostic signal from one control unit 50, 52 matches the expected frequency of the diagnostic signal of the other control unit 50, 52, TCU 32 issues an inverter software mismatch fault indicating the wrong software is loaded on at least one of control units 50, 52. Although not shown in FIG. 7, TCU 32 is configured to generate additional fault codes for various other detected failures. In some conditions, TCU 32 may generate a system fault upon detection of the system malfunction that is configured to halt or suspend one or more operations of vehicle 10 until the fault is corrected.

While sensor diagnostic system 88 is described in conjunction with a utility vehicle, the system may also be used on any electric vehicle having at least one motor or generator. Further, the control units of controller 30 may be used to control more than one electric machine. For example, control unit 50 may include multiple sensors 104 for providing speed feedback from multiple electric machines, and microprocessor 102 may be programmed to set the diagnostic frequency for each sensor 104. Similarly, a microprocessor 102 may be configured to control multiple electric machines.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

The invention claimed is:

1. A vehicle including:
a chassis;
a ground engaging mechanism configured to support the chassis;
an electric machine supported by the chassis, the electric machine including at least one of a generator and a motor;
a detector configured to detect a speed of the electric machine; and
a controller coupled to the detector and configured to control the electric machine, the detector being configured to provide a frequency output to the controller representative of the detected speed of the electric machine and a diagnostic signal to the controller having a predetermined frequency, the detector automatically providing the diagnostic signal to the controller upon activation of the detector and prior to providing the frequency output to the controller, the controller being configured to detect a communication fault between the detector and the controller based on the diagnostic signal.

2. The vehicle of claim 1, further including an electrical connector coupling the detector to the controller for communication between the detector and the controller, the controller detecting an improper connection of the electrical connector between the detector and the controller based on the diagnostic signal.

3. The vehicle of claim 2, wherein the diagnostic signal is comprised of a series of pulses, wherein the controller identifies the improper connection based on the detection of missing pulses in the diagnostic signal received at the controller.

4. The vehicle of claim 2, wherein the electric connector includes a first communication line supporting a first communication protocol and a second communication line supporting a second communication protocol, wherein the controller is configured to communicate control signals with the detector over the first communication line and to receive the diagnostic signal and the frequency output from the detector over the second communication line.

5. The vehicle of claim 4, wherein the first communication protocol includes serial bus communication and the second communication protocol includes standard communication.

6. The vehicle of claim 1, wherein the detector includes a processor and a signal generator provided on a control board assembly, wherein the processor includes a memory containing software configured to instruct the signal generator to generate the diagnostic signal at the predetermined frequency.

7. The vehicle of claim 6, wherein the controller is configured to detect a software fault based on a detected frequency of the diagnostic signal being different from the predetermined frequency.

8. The vehicle of claim 6, wherein the signal generator includes a field-programmable gate array, the electric machine includes a position sensor providing position data to the detector, and the signal generator converts the position data provided with the position sensor into a frequency signal representative of the detected speed of the electric machine.

9. The vehicle of claim 1, further including a second electric machine and a second detector configured to detect a speed of the second electric machine, the second detector being configured to provide a diagnostic signal to the controller having a second frequency different from the predetermined frequency of the diagnostic signal of the detector, the diagnostic signals provided with the detector and the second detector being received at different frequency inputs of the controller.

10. The vehicle of claim 9, wherein the diagnostic signal of the detector is configured to identify the detector to the controller, and the diagnostic signal of the second detector is configured to identify the second detector to the controller.

11. The vehicle of claim 9, wherein the electric machine and the second electric machine are motors configured to drive the ground-engaging mechanism, the controller is configured to provide torque commands to the electric machine and the second electric machine, the controller is configured to timestamp the receipt of the diagnostic signals from the detector and the second detector, and the controller determines an offset algorithm based on the difference of arrival time of the diagnostic signals received from the detector and the second detector to coordinate the torque commands provided with the controller to the electric machine and the second electric machine.

12. The vehicle of claim 9, wherein the controller is configured to detect a software fault based on a detected frequency of the diagnostic signal of the second detector being substantially the same as the predetermined frequency of the first detector.

13. The vehicle of claim 1, wherein the processor of the detector includes an active state and a standby state, wherein the detector is configured to automatically generate the diagnostic signal upon transitioning from the standby state to the active state.

14. The vehicle of claim 1, wherein the controller detects the communication fault when the controller receives the diagnostic signal from the detector during an operation of the electric machine.

15. The vehicle of claim 1, wherein the detector includes at least one dip switch configured to set the predetermined frequency of the detector.

* * * * *